(12) United States Patent
Miyake et al.

(10) Patent No.: US 8,664,559 B2
(45) Date of Patent: Mar. 4, 2014

(54) ELECTRICAL DISCHARGE MACHINE

(75) Inventors: Hidetaka Miyake, Tokyo (JP);
Takayuki Nakagawa, Tokyo (JP);
Yoshihito Imai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1598 days.

(21) Appl. No.: 11/816,830

(22) PCT Filed: Feb. 28, 2005

(86) PCT No.: PCT/JP2005/003311
§ 371 (c)(1),
(2), (4) Date: Aug. 22, 2007

(87) PCT Pub. No.: WO2006/092837
PCT Pub. Date: Sep. 8, 2006

(65) Prior Publication Data
US 2008/0197115 A1 Aug. 21, 2008

(51) Int. Cl.
*B23H 7/26* (2006.01)
(52) U.S. Cl.
USPC .......................................................... 219/69.2
(58) Field of Classification Search
USPC ................... 219/69.12, 69.15, 69.2
See application file for complete search history.

(56) References Cited

U.S. PATENT DOCUMENTS

| | | | | |
|---|---|---|---|---|
| 4,066,378 A | * | 1/1978 | Saito et al. | 408/46 |
| 5,755,448 A | * | 5/1998 | Kanaan et al. | 279/75 |
| 5,977,503 A | * | 11/1999 | Leach et al. | 219/69.15 |
| 6,211,480 B1 | | 4/2001 | Nagata | |
| 6,403,910 B1 | * | 6/2002 | Stang et al. | 219/69.15 |
| 6,627,838 B2 | * | 9/2003 | Kato et al. | 219/69.2 |
| 7,082,693 B2 | | 8/2006 | Klein et al. | |
| 7,518,081 B2 | * | 4/2009 | Miyake et al. | 219/69.2 |
| 2004/0256363 A1 | * | 12/2004 | Lin | 219/69.15 |
| 2005/0249561 A1 | * | 11/2005 | Clark | 408/204 |
| 2007/0102402 A1 | * | 5/2007 | Miyake et al. | 219/69.15 |

FOREIGN PATENT DOCUMENTS

| | | | |
|---|---|---|---|
| DE | 198 04 371 A1 | 8/1998 | |
| EP | 0 286 779 | 10/1988 | |
| EP | 0 826 455 | 3/1998 | |
| EP | 1 138 428 A1 | 10/2001 | |
| JP | 61-14820 A | * 1/1986 | |
| JP | 4-41129 | 2/1992 | |
| JP | 8 290332 | 11/1996 | |
| JP | 11-320271 A | * 11/1999 | |
| JP | 2000 301417 | 10/2000 | |
| JP | 2001 38532 | 2/2001 | |
| JP | 2001-38532 A | * 2/2001 | |
| WO | 02 24389 | 3/2002 | |
| WO | WO-2005/070600 A1 | * 8/2005 | |

* cited by examiner

*Primary Examiner* — Geoffrey S Evans
(74) *Attorney, Agent, or Firm* — Oblon, Spivak, McClelland, Maier & Neustadt, L.L.P.

(57) ABSTRACT

An electrical discharge machine feeds an electrode wire received within a guide tube to a process region of a machined article. The electrical discharge machine includes a cylindrical hollow driving shaft arranged in a vertical direction, which has a space for receiving the guide tube with the electrode wire along a vertical central axis. A head assembly includes a first holding member for holding the guide tube, and a second holding member for holding the electrode wire extending from a bottom opening of the guide tube. The head assembly is detachably coupled with a bottom portion of the driving shaft. Therefore, the electrode wire can be replaced by replacing the head assembly.

15 Claims, 16 Drawing Sheets

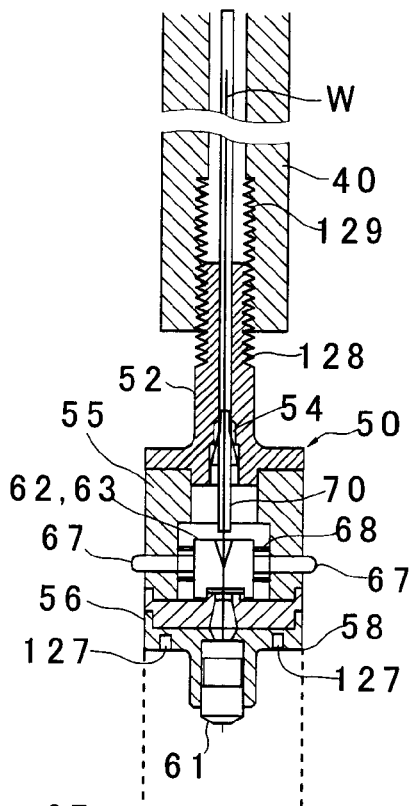
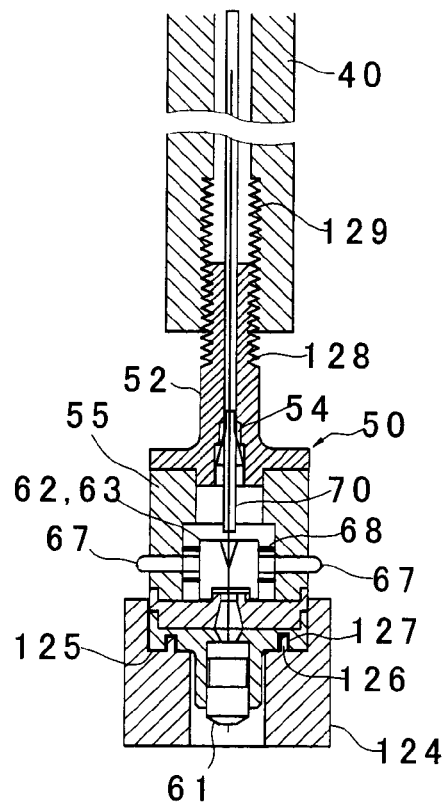
Fig.4A  Fig.4E
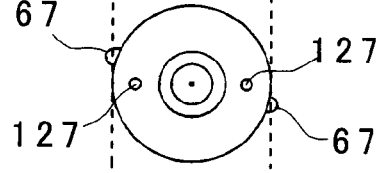
Fig.4B
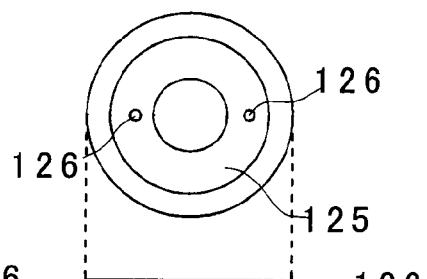
Fig.4C
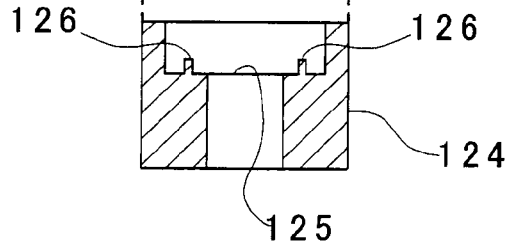
Fig.4D Fig. 7A
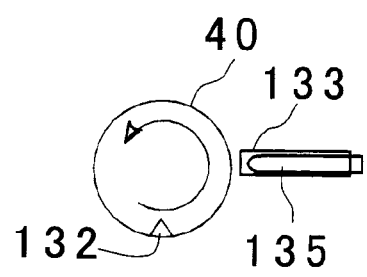
Fig. 7C
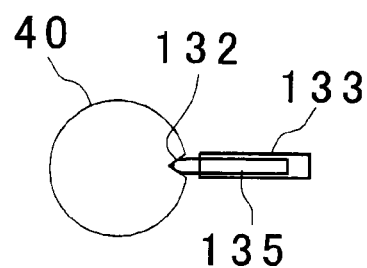
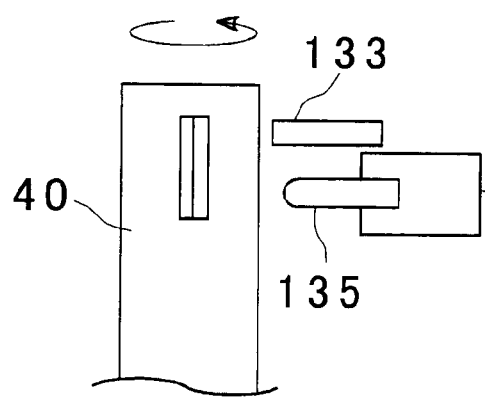
Fig. 7B
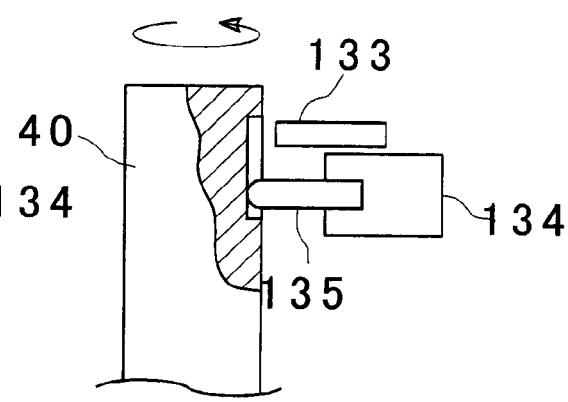
Fig. 7D

ELECTRICAL DISCHARGE MACHINE

TECHNICAL FIELD

The present invention related to an electrical discharge machine to process an article to be machined by applying a voltage between the article and a discharging wire that is immersed in or sprayed with electrically non-conductive liquid, for generating an electrical discharge therebetween and fusing the article.

BACKGROUND ART

In the electrical discharge machine to process the machined article (article to be machined) of metal by means of electrical discharge between the machined article and the discharging wire that is immersed in or sprayed with electrically non-conductive liquid, the tip of the discharge wire has to always be kept in a given position opposing to a discharge process region of the machined article to achieve stable electrical discharge, in order to machine the article in a desired shape. To that end, a XYZ-driving mechanism has been proposed so far, which maintains a constant discharge distance between the discharge wire and the machined article by shifting either one of them. The driving mechanism shifts either one of the discharge wire and the machined article to adjust a potential indicative of a relative position therebetween, to a predetermined value. Also, in general, a desired final shape of the machined article may rather be complicated and the distance between the discharge wire and the machined article during machining may often be approximately 10 microns or less. In this circumstance, the XYZ-driving mechanism is required to be quickly responsive to adjust the relative position for a targeted potential.

In order to satisfy with such requirement, a patent document 1, WO 02/24389 A1, discloses a process and apparatus for machining by electrically discharging with a XYZ-driving mechanism of quick response. According to this structure, if a thin tungsten wire having a diameter of approximately 0.2 mm or less is used, it may be consumed in a short time period. Also, for example, if the machined article is to be processed deeply, the discharge wire has to be fed out more, expecting that it will quickly be consumed, otherwise, the discharge wire should be fed intermittently in response to consumption thereof. However, the patent document 1 fails to disclose an automatic feeder of the thin wire. Therefore, since it takes substantial time to feed the thin, quick-consumptive wire of controlled length, the apparatus described in the patent document 1 cannot achieve the high-speed processing unless a high-speed wire feeding mechanism is incorporated therein.

Another patent document 2, JP 08-290332 A, discloses a wire feeding mechanism, in which a top portion of an electrode wire is held by a holder that is supported by a chuck provided with a main shaft of the processing apparatus. In this structure, the holder is replaced together with remained portion of the wire without being fused and consumed during electrical discharge. Also, in order to avoid frequent replacement of the wire and frequent interruption of electrical discharge caused thereby, the elongated wire having length of approximately 30 cm is used. However, since such thinner wire is less rigid and held at the top portion, such elongated wire behaves elastically and the bottom portion of the wire oscillates vertically and horizontally relative to the opposing machined article. Thus, the apparatus of the patent document 2 has a drawback, which cannot feed out the wire in a stable and reliable manner. Also, even in case where the XYZ-driving mechanism is used for driving the machined article or the wire in a quickly responsive manner, there is another drawback that such quick response would be deteriorated at the bottom portion of the wire. Therefore, the wire feeding mechanism of the patent document 2 cannot be incorporated into the electrical discharge machine of the patent document 1.

Furthermore, a patent document 3, JP 2001-038532 A, discloses another wire feeding mechanism to continuously feed the wire out of a pair of rollers. However, this mechanism also has several problems. For instance, the wire may be deformed or flattened close to the pressing region of the roller. Also, since the wire is wound around and held by a roller, thereby prohibiting the wire to be pivoted around the center axis thereof, it is difficult to machine a cylindrical hole on the article straightly without eccentricity.

In addition, a patent document 4, EP 0826455 B1, discloses another wire mechanism for centering the wire, in which the wire may be released if necessary. However, this document also fails to even suggest an automatic feeder of the wire.

| Patent Document 1: | WO 02/24389 A1 |
| Patent Document 2: | JP 08-290332 A |
| Patent Document 3: | JP 2001-038532 A |
| Patent Document 4: | EP 0826455 B1 |

DISCLOSURE OF INVENTION

Problems to be Solved by Invention

In an electrical discharge machine using a thin electrode wire which is tender in handling, the present invention is to provide a technique for readily replacement of the electrode wire.

Means for Solving Problems

In order to achieve the purpose, the electrical discharge machine according to the present invention includes a cylindrical hollow driving shaft arranged in a vertical direction, which has a space for receiving the guide tube with the electrode wire along a vertical central axis, and a head assembly is detachably coupled with a bottom portion of the driving shaft. The head assembly includes a first holding member for holding the guide tube, and a second holding member for holding the electrode wire extending from a bottom opening of the guide tube.

Advantage of Invention

According to the electrical discharge machine so structured, since the electrode wire can be replaced by replacing the head assembly, the replacement operation can be simplified or automated.

BRIEF DESCRIPTION OF DRAWINGS

FIG. 4A is a cross sectional view of the head assembly and the driving shaft, showing another approach for coupling the head assembly and the driving shaft, FIG. 4B is a bottom view of the head assembly, FIG. 4C is a top plan view of the head holder, FIG. 4D is a vertical cross sectional view of the head holder, and FIG. 4E is a vertical cross sectional view of the head assembly of FIG. 4A connected with the head holder.

FIGS. 7A-7D are view showing a mechanism for holding the driving shaft at a predetermined angular position.

BRIEF DESCRIPTION OF REFERENCE NUMERALS

10: electrical discharge machine, 11: support structure, 12: wire feeder, 13: work (machined article), 14: first elevator, 15: motor, 16: threaded shaft, 17: upper support member, 18: lower support member, 19: horizontal arm, 20: internal screw, 21: vertical guide, 22: vertical pathway, 23: base, 24: container, 25: electrically non-conductive liquid, 26: supporting member, 30: housing, 31-34: housing components, 35: internal space, 40: driving shaft, 41, 42: bearings, 43: disk, 44: upper electromagnet device, 45: lower electromagnet device, 46: rotor, 47: stator, 48: motor, 50: head assembly, 51: coupling member, 52: shank, 53: vertical bore, 54: cylindrical bush, 55: cylindrical housing, 56: bottom member, 57: upper plate, 58: lower plate, 59: wire through-hole, 60: cylindrical chamber, 61: upper wire guide member, 62: wire nipper, 63: chuck, 64: guiding channel, 65: recess, 66: protrusion, 67: actuating member, 68: helical spring, 69: releasing mechanism, 70: wire guide tube, 71: internal chamber, 72: holder, 73: collet, 74: circular cone portion, 75: circular cone recess, 76: nut, 77: internal thread, 78: external thread, 79: opening, 80: annular frame, 81: coil, 82: targeting ring, 83: stopper, 84: frame portion, 85: ring, 86: helical spring, 87: internal surface (cone surface), 88: elevation controlling mechanism, 89: internal cover plate, 90: external cover plate, 91: gap, 92: gap sensor, 93: wire guide through-hole, 94: air supply mechanism, 95: air supply tube, 96: air source, 97: air filter, 98: air drier, 99: electromagnetic valve, 100: lower wire guide member, 101: wire guide through-hole, 102: horizontal arm, 120: automatic replacing device, 121: support frame, 122: pallet, 123: arms, 124: head holder, 125: recess, 126: protrusion, 127: bore, 128: external thread, 129: internal thread

BEST MODE FOR CARRYING OUT THE INVENTION

Referring to drawings, an electrical discharge machine according to the present invention will be described herein.

Figure 1:
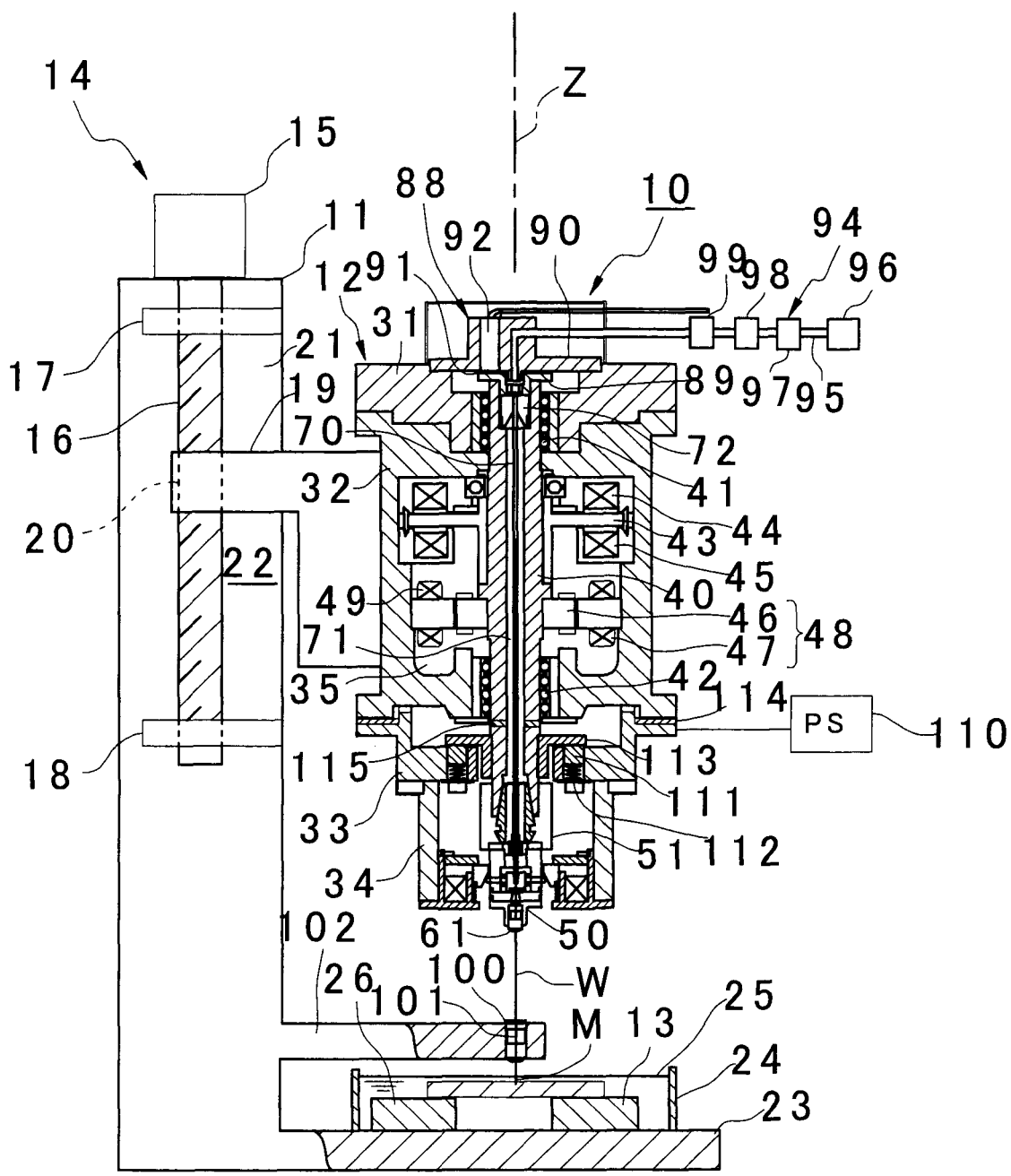
FIG. 1 is a partially fragmentary side view of the electrical discharge machine according to the present invention.

FIG. 1 illustrates the electrical discharge machine 10 according to the present invention. The electrical discharge machine 10 includes a support structure 11 for supporting a wire feeder 12 and a work (machined article). The support structure 11 includes an elevator 14 (first elevator) vertically moving the wire feeder 12. The elevator 14 is provided with a motor 15, preferably a servomotor. The motor 15 is mounted on the support structure 11, and connected with a vertical threaded shaft 16. The threaded shaft 16 is supported on upper and lower support members 17, 18, rotatably around a longitudinal axis thereof. Also, the threaded shaft 16 is engaged with an internal screw 20 threatened in a horizontal arm 19 of the wire feeder 12. Provided on both sides of the horizontal arm 19 is a pair of vertical guides 21 vertically extending (only one of them is shown in the drawing), allowing the horizontal arm 19 to vertically move within a vertical pathway 22 defined between the pair of vertical guides 21. In this structure, upon rotation of the motor 15, the wire feeder 12 is vertically driven while being guided by the vertical guides 21. On the other hand, a base 23 holding the work 13 supports a container 24. The container 24 receives electrically non-conductive liquid 25, e.g., water, and the work 13 is supported by a supporting member 26 within the liquid.

The wire feeder 12 is designed to feed out a wire W towards a process region (a process station) of the work 13, and has an external housing 30 of substantially cylindrical configuration. The housing 30 is formed of a plurality of housing components. According to the present embodiment, the housing 30 includes four of the housing components 31, 32, 33, 34 connected and assembled with appropriate fasters, e.g., bolts and nuts. Also, the housing 30 defines an internal space 35, in which a cylindrical tubular driving shaft (internal housing) 40 is arranged.

The driving shaft 40 is supported by upper and lower bearings 41, 42, and is adapted to rotate around the vertically extending longitudinal central axis Z and to slightly move in a vertical direction. A rotary stroke bush and a pneumatic bearing may preferably be used for the bearings 41, 42. The driving shaft 40 supports a magnetic disk 43 coaxially secured on a circumference of the driving shaft 40. Also, upper and lower electromagnet devices 44, 45 are provided over and beneath the disc 43, respectively, which are also mounted on the housing 30 within the internal space 35, thereby defining another elevator (a second elevator) in conjunction with the disc 43. Therefore, current running through the coils of the electromagnet devices 44, 45 is adjusted to change magnetic attractive force generated thereby, so that the disc 43 and the driving shaft 40 can be shifted vertically. Further, the driving shaft 40 supports a rotor 46 secured thereon, forming a motor (a rotating mechanism) 48 in conjunction with stators secured on the housing 30. Therefore, application of voltage on the coils of those stators 48 rotates the rotor 47 and the driving shaft 40.

Figure 2A:
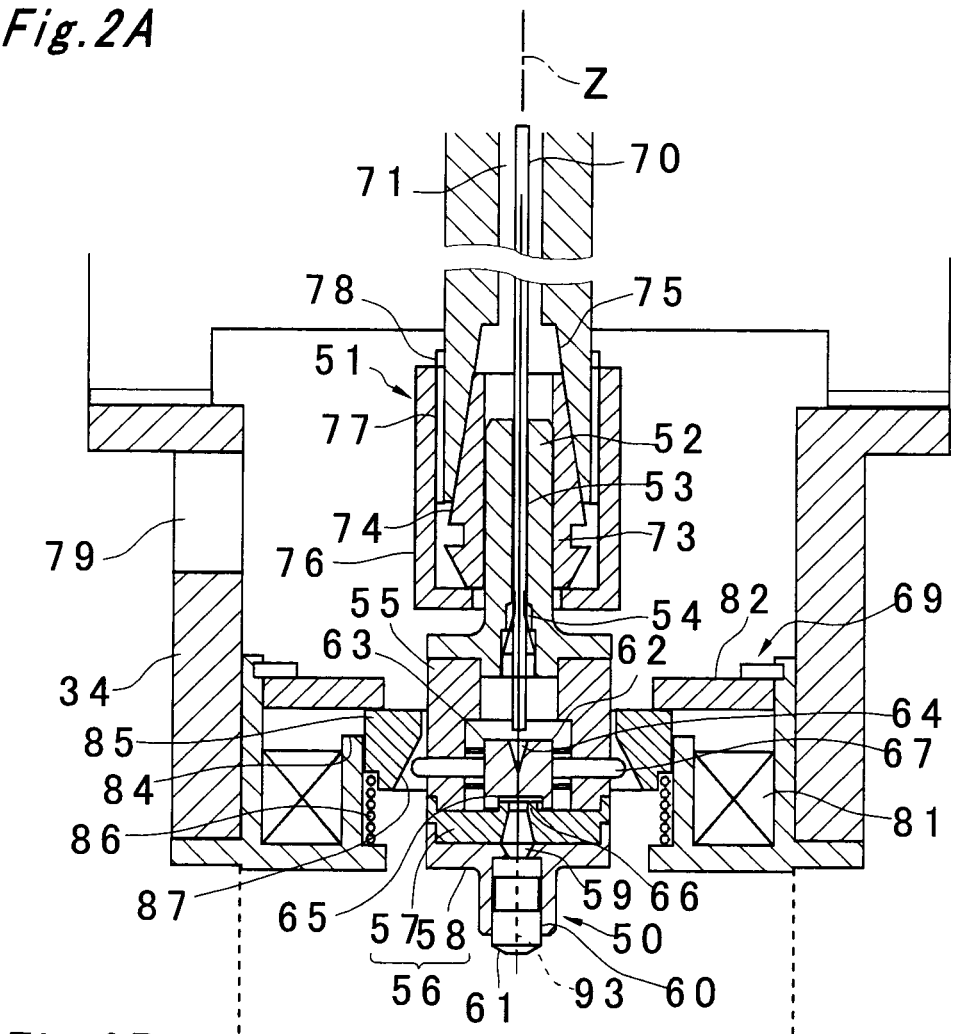
FIG. 2A is a vertical cross sectional view of the electrical discharge machine of FIG. 1, showing a structure of the head assembly thereof.
Figure 2B:
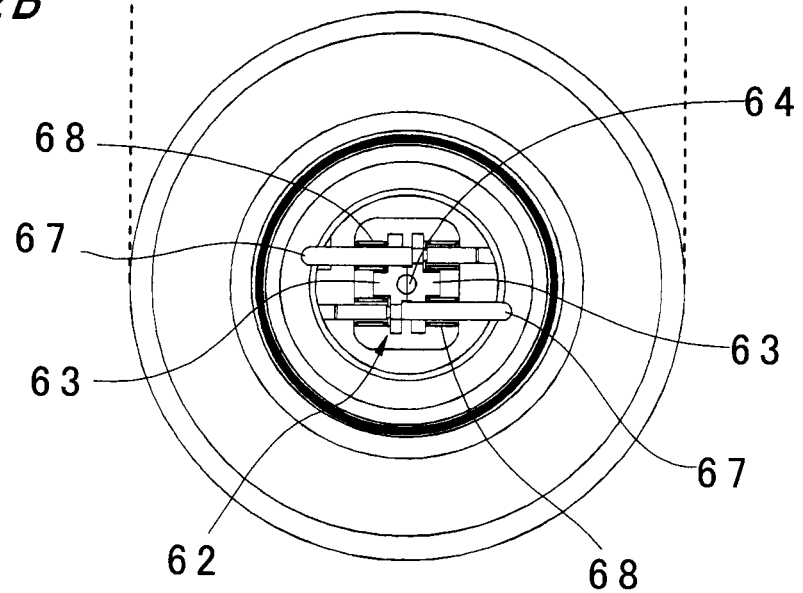
FIG. 2B is a view of the electrical discharge machine of FIG. 2A, showing a structure of the head assembly thereof.

Furthermore, the driving shaft 40 supports a head assembly (head mechanism) 50, which can be detachably coupled to the bottom portion of the driving shaft 40 through a coupling member 51. As illustrated in FIGS. 2A and 2B, the head assembly 50 includes a shank 52 at the top end. The shank 52 has a central vertical bore 53 for guiding the wire W therethrough. The vertical bore 53 has a bottom end enlarged in a step-like configuration and provided and filled with a cylindrical bush (a first holding member) 54, preferably made of rubber. The shank 52 supports a cylindrical housing 55 and a bottom member 56 attached on the bottom of the cylindrical housing 55, as they are suspended from the shank 52. The shank 52, the housing 55 and the bottom member 56 are securely connected by means of fasters such as bolts. The bottom member 56 includes a plurality of annular members, for example, upper and lower plates 57, 58, and defines a central wire through-hole 59. Also, the lower plate 58 has a cylindrical chamber 60, in which an upper wire guide member 61 is inserted. The upper wire guide member 61 has a wire guide through-hole 93 extending along the longitudinal axis Z of the driving shaft 40. The internal diameter of the wire guide through-hole 93 is slightly larger than the outer diameter of the wire W.

Arranged within the housing 55 is a wire nipper (a second holding member) 62, which includes a pair of opposing chucks 63 in the present embodiment. The wire nipper 62 is provided with a guiding channel 64 having a shape of an inverted cone, of which center axis is preferably aligned with the longitudinal axis Z of the wire feeder 12. The guiding channel 64 has two half portions, each of which is formed in the respective chuck 63. Each chuck 63 is provided with a recess 65 at the bottom. The upper plate 58 has a pair of protrusions 66 on the top, which are received in the recess 65. As illustrated, the protrusion 66 arranged at the left side in the drawing restricts motion of the chuck 63 located at the left side. Thus, the chucks 63 are designed such that opposing vertical surfaces thereof are aligned with the longitudinal axis Z of the driving shaft 40 while being restricted by the protrusions 66. Each of the chucks 63 has a stick-like actuating member 67, extending in a horizontal direction perpendicular to the vertical surfaces. As shown in FIG. 2B, the housing 55 includes horizontal holes extending therethrough, for receiving the actuating members 67, each of which is designed to horizontally move therein between a closed position (holding condition, as shown) and an opened position (releasing condition, not shown). Also, helical springs 68 are provided at the back side of the actuating member 67, for biasing the chuck 63 to the closed position. The spring of the chuck 63 arranged at the left side is set to have biasing force greater than one of the another chuck provided at the right side so that the contacting surface of the chucks 63 are aligned with the longitudinal axis Z of the driving shaft. As illustrated in FIG. 2B, each of the actuating members 67 has a portion arranged at back side of the opposite chuck, which extends from comes out of the circumference of the housing 55, so that the chuck 63 can be pushed towards the opened position against the biasing force of the spring 68, by means of the releasing mechanism (switching means) 69 as will be described below.

A wire guide tube 70, composed of a copper pipe, for example, for receiving the thin electrode wire W is inserted into the shank 52 and securely held by the bush 54. When the wire W has the diameter of 100 microns or less, the copper pipe is used as the wire guide tube 70, having the outer diameter of approximately 1 mm and the inner diameter of approximately 0.5 mm. The wire guide tube 70 extends beyond the bottom of the shank 52 up to a given position immediately above the wire nipper 62. The wire W received within the wire guide tube 70 extends beyond the open bottom of the wire guide tube so as to be held between the opposing chucks 63. As illustrated in FIG. 1, while the head assembly 50 is coupled with the driving shaft 40, the guide tube 70 is arranged within an internal chamber 71 of the driving shaft 40. Also, the guide tube 70 is supported at the top thereof along the longitudinal axis Z of the driving shaft, by means of a cylindrical holder 72 that is provided within and secured close to the top of the internal chamber 71. Thus, the cylindrical holder 72 holds the guide tube 70 in alignment with the longitudinal axis Z during rotation of the driving shaft 40.

As shown in FIG. 2A, the coupling member 51 for detachably coupling the head assembly 50 with the driving shaft 40 includes a collet 73. The collet 73 is provided with a circular cone portion 74 tapered towards the top, and inserted around the upper cylindrical portion of the shank 52. The driving shaft 40 includes a circular cone recess 75 which is formed at the bottom internal surface and upwardly tapered, and the circular cone portion 74 of the collet 73 is pushed into and engaged with the circular cone recess 75 of the driving shaft 40. Then, a nut having an internal thread 77 is engaged with an external thread 78 formed on the bottom outer surface of the driving shaft 40 so that the collet 73 and the head assembly 50 are securely coupled with the driving shaft 40. In order to engage the internal thread 77 of the nut 76 with the external thread 78 of the driving shaft 40, an appropriate industrial tool such as a wrench (not shown) may be inserted into an opening 79 formed on the housing 34 to hold the nut 76, and then the driving shaft 40 may be rotated by the motor 48.

As illustrated in FIGS. 2A and 2B, the releasing mechanism 69 is supported by and within the bottom housing 34, surrounding the head assembly 50, and includes an annular frame 80 for supporting a coil 81 extending around the head assembly 50. An annular targeting ring 82 of magnetic material is arranged over the coil 81 so as to vertically move between a stopper (upper regulation member) 83 attached over the targeting ring 82 and a frame portion (lower regulation member) 84 secured below the targeting ring 82. The ring 85 is positioned radially inside the coil 81 and biased upwardly towards the targeting ring 82 by a helical spring 86, thereby holding the ring 85 as well as the targeting ring 82 at the uppermost position. The ring 85 has an internal surface 87 that is upwardly tapered (circular cone engaging recess or circular cone engaging surface). When the coil 81 is applied with current, the targeting ring 82 and the ring 85 are pulled down, and the upwardly tapered internal surface 87 of the ring 85 contacts with the actuating member 67 and pushes the actuating member 67 and the chucks 63 from the closed position to opened position, thereby releasing the wire W from the wire nipper 62.

Referring to FIG. 1, an elevation controlling mechanism 88 for the driving shaft is arranged on the top of the housing 30. The elevation controlling mechanism 88 includes an internal cover plate 89 secured on the top of the driving shaft 40 for closing the top aperture thereof, and an external cover plate 90 secured on the top of the housing 30 for closing the top aperture thereof. The internal and external cover plates 89, 90 are vertically spaced from each other by a gap 91 of approximately 0.5 mm, for example. A gap sensor 92 is provided on the external cover plate 90 for measuring the gap 91. Therefore, the current applied to the electromagnet devices 44, 45 may be adjusted in accordance with output of the gap sensor 92 so that upward and downward motion or amplitude of the vertical oscillation for the driving shaft 40 can be controlled.

In an air supply mechanism 94, an air supply tube (air supplier) 95 is secured with the external cover plate 90, extending along the longitudinal axis Z so that the outlet thereof opposes to the upper open end of the guide tube 70 and air flowing from the outlet is supplied to the guide tube 70. The air supply tube 95 is connected with an air source 96 via an air filter 97, an air drier, and an electromagnetic valve 99.

A lower wire guide member 100 includes a vertical wire guide through-hole 101 having inner diameter slightly greater than outer diameter of the wire W. Also, the lower wire guide member 100 is supported by a horizontal arm 102 of the supporting mechanism 11 such that the wire guide through-hole 101 is in alignment with the longitudinal axis of the driving shaft 40.

In order to supply, with power, the wire W supported by the driving shaft 40, a power source 110 is connected with the housing component 33, which receives a brush 111. The brush 111 is pressed on and connected with a conductive disc 113 secured around the driving shaft 40. Therefore, power is supplied from the power source 110 through the housing component 33, the brush 111, the driving shaft 40, and the collet 73 of the head assembly, to the wire W being held by the chucks 63. In order to prevent current from running through the electromagnet devices 44, 45 and the motor 48, an insulating member 114 is arranged between the first and second housing components 32, 33, and another insulating member 115 is provided at an intermediate portion beneath the motor 48.

Operation of the electrical discharge machine 10 so structured will be described herein. The wire W received within the wire guide tube 70 is held by the wire nippers 62 of the head assembly 50. Also, the wire W extends through the wire guide through-holes 93, 101 of the upper and lower wire guide members 93, 101, respectively, and into the process region (process station) M immersed within dielectric liquid, in which the tip (bottom end) of the wire W opposes to the work 13 with small discharge gap spaced therefrom. In this configuration, the wire W is supplied with power by the power source 110 so that electrical discharge is generated between the tip of the wire W and the opposing region of the work 13. This fuses and processes a portion of the work 13 opposing to the tip of the wire W. Meanwhile, the tip of the wire W is fused and consumed by the electrical discharge. Therefore, in order to establish stability of the electrical discharge between the wire W and the work 13, it is necessary to successively feed the wire W out towards the discharging region. To this end, the wire W should be supplied continuously or intermittently to maintain the potential gradient depending on the discharge gap between the wire W and the work 13.

To feed the wire to the process station, there are various approaches and combination thereof as will be described hereinafter. Firstly, one approach using the air supply mechanism 94 for feeding the wire W will be discussed herein. According to the air supply mechanism 94, the air from the air source 96 is supplied through the air supply tube 95 to the upper open end of the guide tube 70. The air supplied to the guide tube 70 forms a stream of air running downwardly in the wire guide tube 70 with force for downwardly conveying the wire W received therein. Meanwhile, the coil 81 of the releasing mechanism 69 is applied with current to pull down the targeting ring 82, thereby lowering the ring 85 against the biasing force of the spring 86. This allows the internal cone surface 86 of the ring 85 to contact with the actuating member 67, and to push the chucks 63 and the wire nippers towards the opened position, thereby releasing the wire W. As the result, the released wire W receives the downward force due to the air running through the wire guide tube 70 to move downwardly, so that the wire W is fed out towards the discharge station. It should be noted that the amount of the wire W being fed out depends upon a releasing time period of the chucks, which may be adjusted by controlling, by means of controller (not shown), the time period for which the current is supplied with the coil 81.

The current running through the coil 81 may be interrupted to stop supplying the wire W. This allows the ring 85 to shift upwardly by the biasing force of the spring 86 and to space away from the actuating member 67. Then, the biasing force of the spring 68 returns the actuating member 67 and the chucks 63 in the closed position to hold the wire W. The above-mentioned recesses and the protrusions 66 have a function keeping the interface (wire holding surfaces) of the chucks 63 in alignment with the longitudinal axis Z of the driving shaft 40.

The air may be supplied from the air source 96 via the air supply tube 95 in a continuous or intermittent manner.

In the meanwhile, moisture within the air supplied to the wire guide tube 70 may cause a droplet on the inner surface of the wire guide tube 70 and/or the outer surface of the wire W, which may in turn cause the wire W to attach onto the inner surface of the wire guide tube 70. To avoid this, the air dryer 98 is provided in the present embodiment, intervening in the air supply tube 95, to retrieve the moisture contained in the air. Therefore, the air supplied to the wire guide tube 70 is kept in a dried condition, so that the wire W can reliably be fed out by the air running through the wire guide tube 70. Also, an air filter is intervened in the air supply tube 95, which collects in advance, dusts, moisture, and oil content contained in the air to further secure smooth feeding of the wire W. Moreover, a highly water-repellent coating of fluorine-based resin material, such as poly-tetrafluoroethylene may be formed on the inner surface of the wire guide tube 70. Alternatively, the wire guide tube 70 may be formed of such fluorine-based resin material. In this instance, the inner surface of the wire guide tube 70 repels droplet so as to feed the wire W in a reliable manner.

Next, operation for feeding out the wire by means of the elevator 14 will be described herein. Firstly, the coil 81 of the releasing mechanism 69 is applied with current to pull down the target ring 82 and the ring 85, thereby shifting the chucks 63 to the opened position. In this situation, the motor 15 of the elevator 14 is driven so as to raise the wire feeder 12. While the wire W is released from the wire nipper 62, frictional contact with the wire guide through-hole 101 prevents it from moving upwardly. When the wire feeder is raised up to a given height, the current running through the coil 81 is interrupted to return the chucks 63 of the wire nipper 62 to the closed position. Then, if desired, the motor 15 is driven to resupply the wire to the discharge station M by lowering the wire feeder 12 and the wire W in accordance with the consumed length of the wire.

Furthermore, operation for feeding the wire by means of the electromagnet devices 44, 45 provided on the driving shaft 40 will be described herein. Firstly, the current applied with the coil of the electromagnet devices 44, 45 are adjusted so as to force the driving shaft 40 to the lowermost position relative to the electromagnet devices 44, 45. Next, the coil 81 of the releasing mechanism 69 is applied with current to pull down the target ring 82 and ring 85, thereby shifting the chucks 63 to the opened position. The current applied with the coil of the electromagnet devices 44, 45 are controlled so as to raise the driving shaft 40 to the uppermost position relative to the electromagnet devices 44, 45. In this instance, the wire W is prohibited to move upwardly due to frictional contact with the bottom wire guide through-hole 101. Then, current running through the coil 81 of the releasing mechanism 69 is interrupted to return the chucks 63 of the wire nipper 62 to the closed position. After that, the current applied with the coil of the electromagnet devices 44, 45 are controlled to adjust the position of the driving shaft 40 together with the wire W, up to the lowermost position relative to the electromagnet devices 44, 45. The electromagnet devices 44, 45 may be driven to move the driving shaft 40 by a distance of 0.5 mm, for example, which is equivalent to the gap 91 between the internal and external cover plates 89, 90. Therefore, by repeating a set of the above-mentioned steps, the wire W may be fed out in desired length (0.5 mm×N repeated times).

When the wire W is to be replaced, the head assembly 50 is decoupled from the driving shaft 40. An industrial tool is inserted into the opening 79 on the bottom housing 34 to hold the nut 76, and the motor 48 drives the driving shaft 40 at a slow rotation rate. This disengages the internal thread 77 of the nut 76 from the external thread 78 of the driving shaft 40, thereby removing the head assembly 50 off the driving shaft 40. In the removed head assembly 50, the actuating member 67 extending from the housing 55 is pushed to shift the chucks 63 to the opened position. The wire remaining in the wire guide tube 70 is picked out therefrom, and a new one is inserted into the wire guide tube 70. Also, the wire is inserted at one end between the chucks 63 of the wire nipper 62 and into the upper wire guide member 61. Lastly, the actuating member 67 is released allowing the chucks 63 of the wire nipper 62 to return to the closed position. After the head assembly 50 is installed with a new wire as described above, the wire guide tube 70 is inserted within the driving shaft 40, and the head assembly 50 is coupled with the bottom portion of the driving shaft 40. In this instance, after the collet 73 arranged around the shank 52 is inserted, the head assembly 50 is secured with the driving shaft 40 by fastening the nut 76. It should be noted that the actuating member 67 extending from the housing 55 has to be spaced from the ring 85 of the releasing mechanism 69 by a given distance, while the head assembly 50 is coupled with the driving shaft 40. To this end, the inserted length of the shank 52 into the driving shaft 40 may be managed, for example, by a length between the bottom of the releasing mechanism 69 and the head assembly 50 extending therefrom.

Figure 3A:
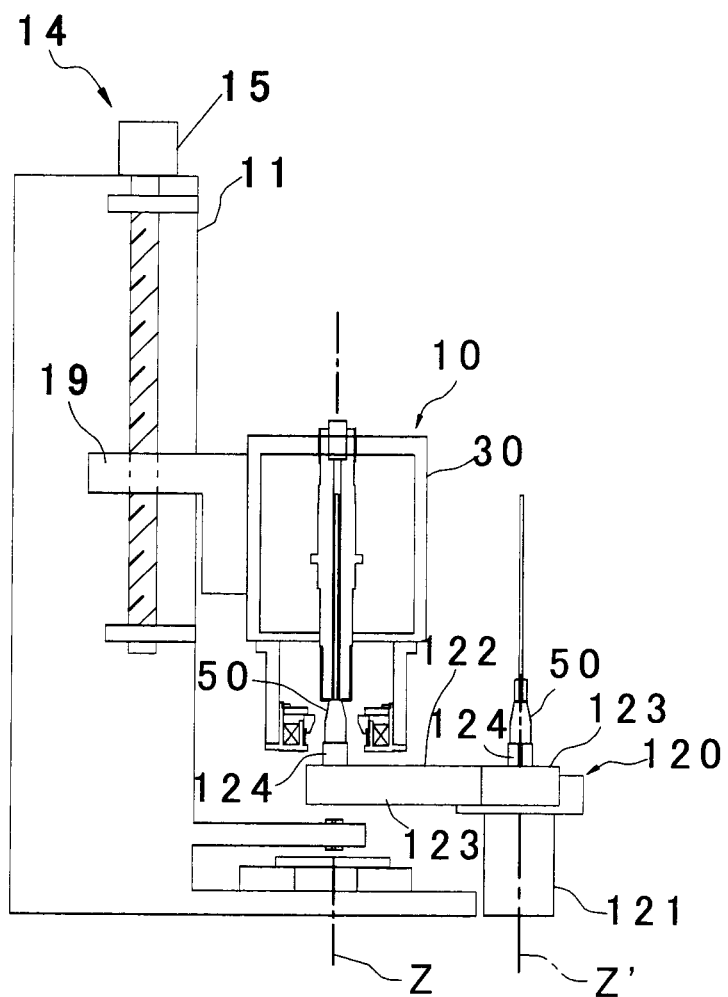
FIG. 3A is a partially fragmentary side view of the electrical discharge machine having an automatic wire replacing device.
Figure 3B:
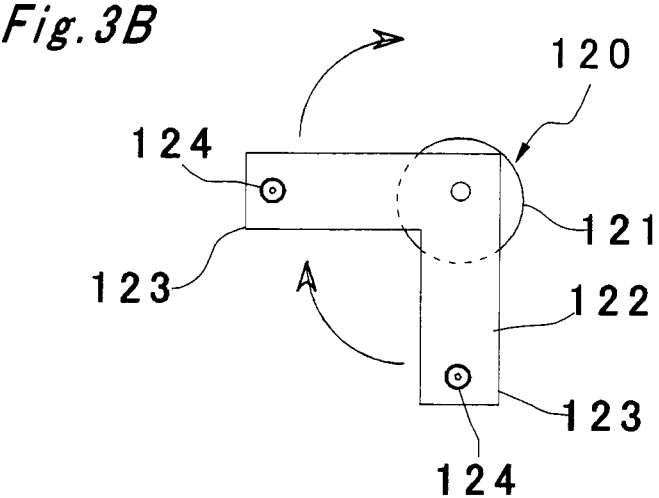
FIG. 3B is a top plan view of the automatic replacing device of FIG. 3A.

An automatic replacing device as illustrated in FIG. 3 may be used for automatically replacing the wire. The automatic replacing device 120 includes a support frame 121 secured on a platform (not shown), and a pallet 122 rotatably secured on the support frame 121 around a vertical axis Z'. In this embodiment, the pallet 122 has an L-shaped member of which center portion is supported by the support frame 121. Also, the pallet 122 has a pair of arms (moving members) 123, each of which has a head holder 124 at the tip thereof away by the same distance from the vertical axis Z'. As illustrated in FIGS. 4A-4E, the head holder 124 includes a cylindrical member with a recess 125 at the top which has configuration complementary with the bottom portion of the head assembly 50 so that the recess 125 receives the bottom portion of the head assembly 50. Also, the head holder 124 includes a pair of protrusions 126 arranged symmetrically relative to the central axis Z', each of which is designed to engage with respective one of bores 126 provided on the bottom surface of the head assembly 50 while the head assembly 50 is situated within the head holder 124. Further, a distance between the vertical axis of the support frame 121 and the central axis Z' of the head holder 124 is set the same as the length between the vertical axis of the support frame 121 and the longitudinal axis Z of the driving shaft 40. In this embodiment, the shank 52 has an external thread 128 which is adapted to engage with an internal thread 129 formed on the bottom portion of the driving shaft 40.

To replace the head assembly 50 with use of the automatic replacing device 120 so structured, the head assembly 50 to be replaced having a fresh wire is set on one of the arms 123 within the head holder 124, in which each protrusion 126 of the head holder 124 engages with the respective bore 127 of the head assembly 50. Then, the arms 123 and the head holder 124 are shifted at a replacing position beneath the driving shaft 40 where the central axis Z' of the head holder 124 is in alignment with the central axis Z of the driving shaft 40. Another one of the arm and the head holder 124 thereof are evacuated at an evacuating position away from the replacing position. Next, the elevator 14 is driven to lower the wire feeder 12. Also, the motor 48 is driven to rotate the driving shaft 40 at a slow rotation rate, in a direction such that the threads 128, 129 loosen. In this instance, while the head assembly 50 is situated within the head holder 124 with each protrusion 126 engaged with the respective bore 127, as the head holder 124 is secured on the arm 23, rotation of the driving shaft 40 releases engagement between the external thread 128 of the head holder 124 and the internal thread 129 of the driving shaft 40.

In particular, when each protrusion 126 of the head holder 124 is engaged with the respective bore 127 of the head assembly 50, the motor 15 receives torque load, which is monitored by a torque sensor (not shown) associated with the motor 48. When the torque sensor detects the torque load, the motor 15 stops lowering the elevator 14 and rotates in an opposite direction to raise the elevator 14. However, the motor 48 for rotation of the driving shaft 40 is kept rotating. To this result, the driving shaft 40 is kept rotating and lifted up with the head assembly 50 being left on and held by the head holder 124, so that the head assembly 50 is released from the driving shaft 40 and retrieved after disengagement between the threads 128, 129. In this case, current applied to the upper and lower electromagnet devices 44, 45 of the wire feeder 12 may periodically be changed to vertically oscillate the driving shaft 40 for facilitating disengagement between the threads 128, 129. Also, it is required to control the lifting rate of the elevator 14 and the disengaging rate of the threads 128, 129 as being equivalent each other so as to prevent the head assembly 50 from applying undue stress to the head holder 124 and the arm 123, or on the other hand, from lifting off the head holder 124.

After retrieving the head assembly 50 from the driving shaft 40, the wire feeder 12 is driven upwardly until the wire guide tube 70 is exposed fully out of the housing 30. When the head assembly 50 is removed, the automatic replacing device 120 pivots by 90 or 270 degrees to shift the pallet 122 so that the head assembly 50 for replacement secured on another arm 123 is situated beneath the driving shaft 40. In this context, the central axis of the head assembly 50 for replacement is in alignment with the central axis Z. Next, the motor 15 of the elevator 14 is driven to move the wire feeder downwardly, and the motor 48 is driven to slowly rotate the driving shaft 40 in a direction such that the threads 128, 129 tighten. The lifting rate by the motor 15 is designed to be equivalent to the engaging rate of the threads 128, 129 by the motor 48 along the central axis. This engages the external thread 128 of the head assembly 50 with the internal thread 129 of the driving shaft 40. Upon full engagement of the threads 128, 129, the torque load on the motor 48 increases drastically. When the above-mentioned torque sensor detects such increase, the motor 48 is deactivated to stop rotating the driving shaft 40, and the motor 15 is deactivated to stop lowering the wire feeder 12.

As above, the wire feeder 12 is installed with the new head assembly 50 and lifted up by the elevator 14, while the head assembly 50 is separated from the head holder 124.

Figure 5A:
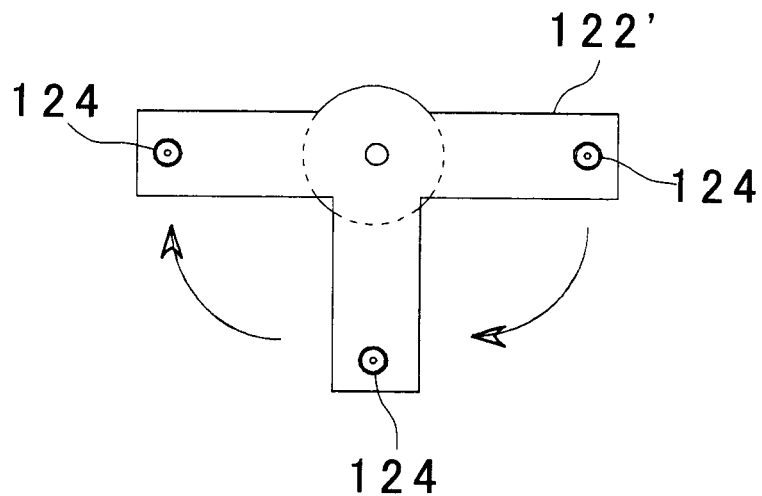
FIG. 5A is a top plan view of the pallet having three arms.
Figure 5B:
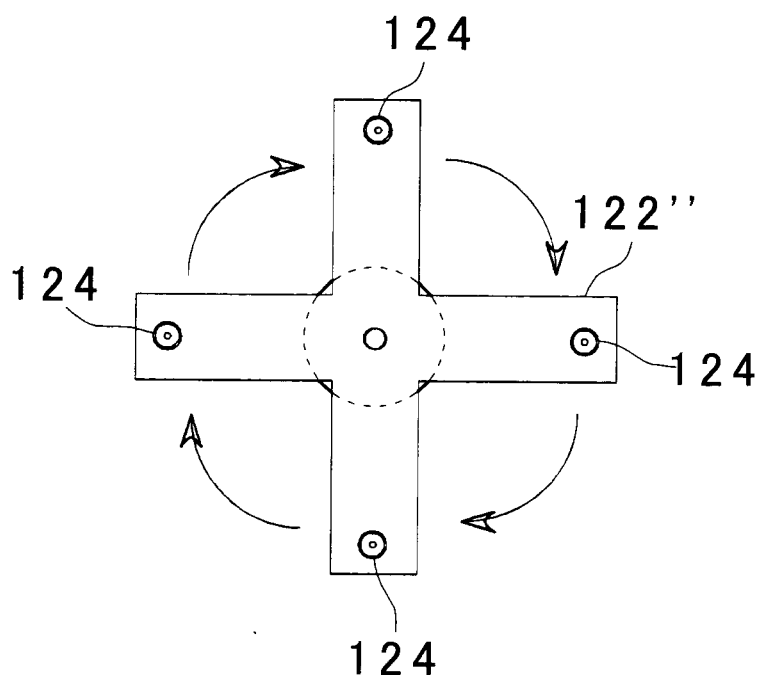
FIG. 5B is a top plan view of the pallet having four arms.

It should be noted that although the L-shaped pallet 122 is used for supporting two head holders 124 in the above embodiment, any other types of pallets may be used for a desired number of the head holders. For instance, as shown in FIG. 5A, a T-shaped pallet 122' may be used for supporting three head holders, alternatively, as illustrated in FIG. 5B, a cross-shaped pallet 122" may be used for providing four head holders. As described above, the pallet with multiple head holders substantially facilitates replacement operation of the head assembly. Also, the pallet may be rotated manually, or by a motor connected thereto in a desired rotation angle.

Figure 6:
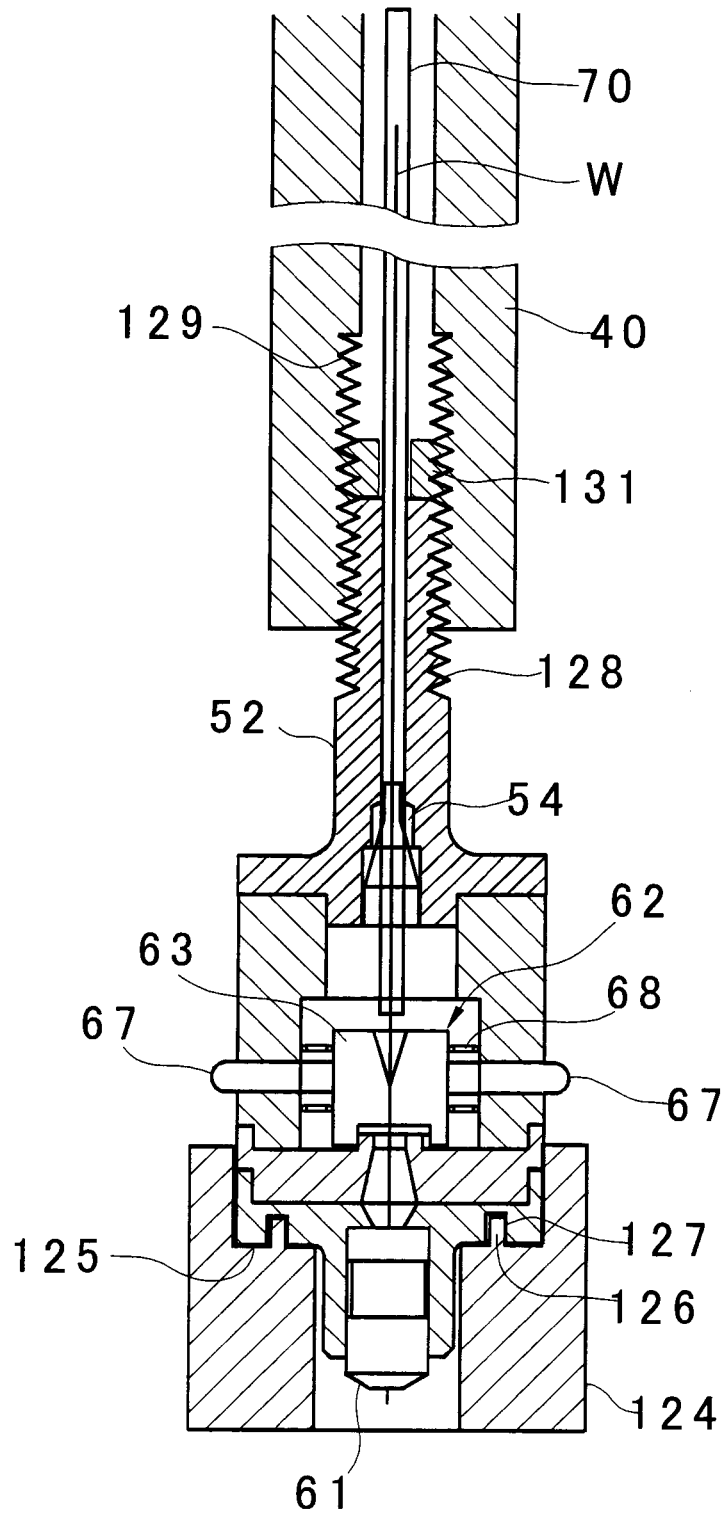
FIG. 6 is a vertical cross sectional view of the driving shaft having a stopper and the head assembly coupled with the driving shaft.

In the foregoing embodiment, the torque sensor provided with the motor 48 is used to detect the torque, in which the threads 128, 129 are tightened until the predetermined torque is detected and the motor 48 stops rotating. Alternatively, for example, as illustrated in FIG. 6, a stopper 131 may be secured on the internal thread 129 of the driving shaft 40 so as to restrict the thread 128 of the head assembly 50. In another example, the threads 128, 129 may be formed of tapered configuration to control engaged length of the threads.

Further, in order to engage the threads 128, 129, the driving shaft 40 is driven to rotate in the foregoing embodiment, alternatively, the head holder 124 may be supported on the pallet 122 and rotated around the longitudinal axis Z' by means of a motor coupled by a drive coupling mechanism such as a belt and a gear, so that the head holder 124 may be driven to rotate by the motor. To this end, the driving shaft 40 has to be anchored, without rotation. A mechanism (locking mechanism) for prohibiting rotation of the driving shaft 40 is illustrated in FIG. 7. The locking mechanism includes a groove 132 on the outer surface of the driving shaft 40. Also, it includes a sensor 133 for detecting the groove 132, a driving apparatus 134 such as a motor or solenoid that drives in accordance with signals output when the groove is detected, and a locking pin 135 actuated by the driving apparatus 134 for interlocking with the groove 132. It is not intended to limit to this approach for prohibiting rotation of the driving shaft 40, either one of the electromagnet devices 44, 45 may be driven in accordance with the signal output when the sensor 133 detects the groove 132, so as to pull and secure the disc 43 thereon, thereby avoiding rotation of the driving shaft 40. Also, the object to be detected by the sensor should not be limited to the groove, and may be a protrusion, reflection, or magnet. Further, any type of sensors, e.g., a mechanical, magnetic, or optical sensor may be applied, depending upon the object to be detected.

Figure 8:
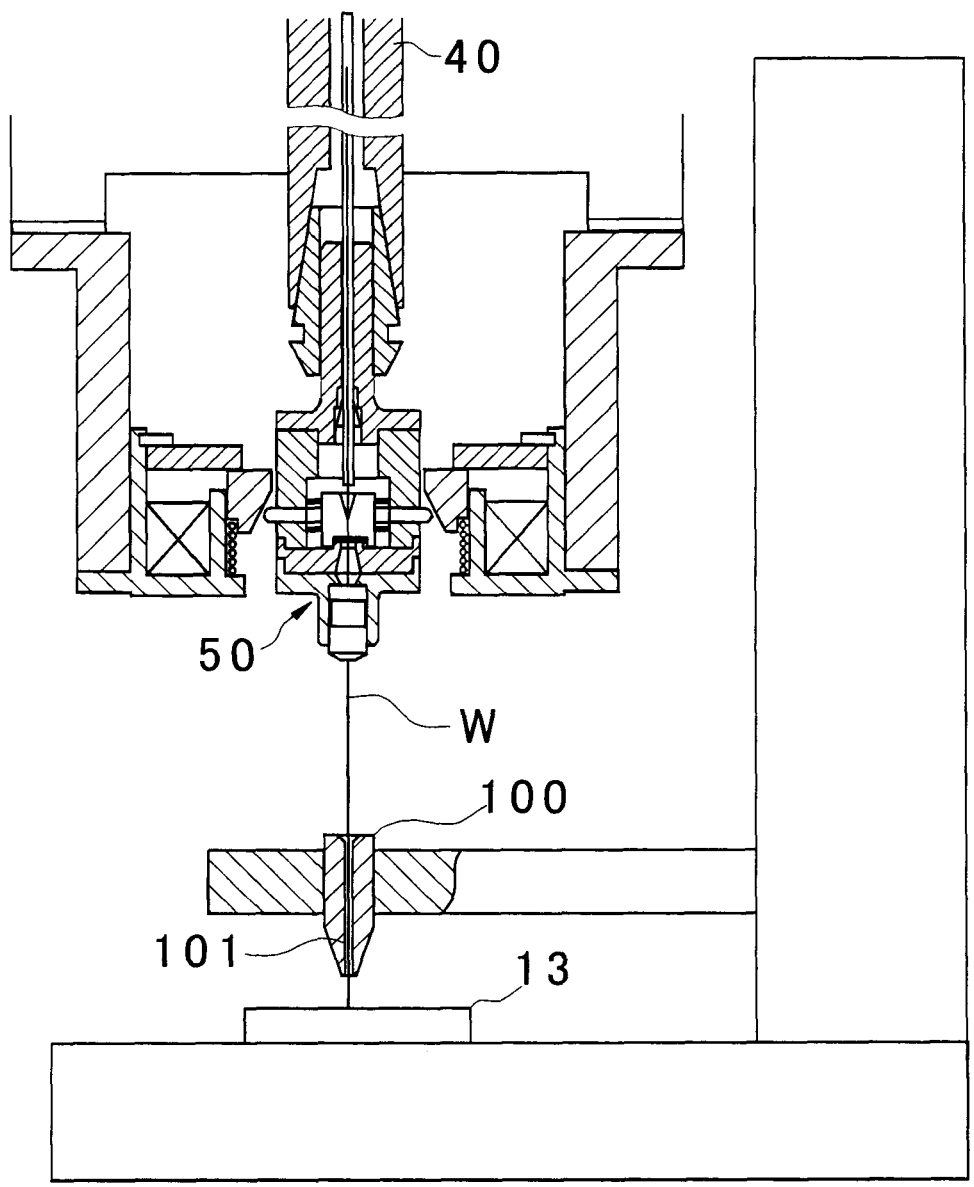
FIG. 8 is a view showing the wire inserted into the wire guide.
Figure 9:
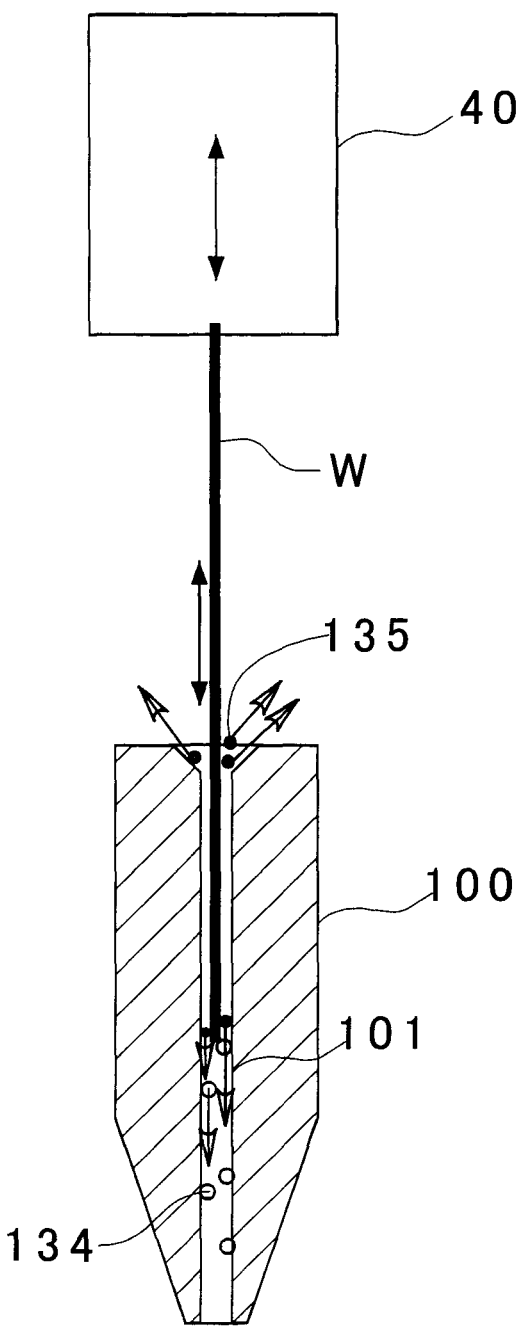
FIG. 9 is a view illustrating operation of the wire while dusts remain in the wire guide.

Referring to FIG. 8, the lower wire guide member 100 is provided beneath the driving shaft 40 to hold the wire W in alignment with the longitudinal axis Z. To this end, the wire guide through-hole 101 of the lower wire guide member 100, which is formed as thin as possible, is designed to have clearance of only 1-2 microns with the wire W. Therefore, as schematically illustrated in FIG. 9, when dust 134 such as processed debris may come into the wire guide through-hole 101, or when dust 135 adhered on the wire W, it may be difficult to insert the wire into the wire guide through-hole 101. Also, the contact between the outer surface of the wire W and the inner surface of the wire guide through-hole 101 may provide difficulty for insertion of the wire. In such situation, the wire may be bent if forcedly inserted therein. In order to facilitate insertion of the wire W into the wire guide through-hole 101, the driving shaft 40 rotates and oscillates the wire by periodically changing the current applied with the electromagnet devices 44, 45. This readily eliminates the dust in the wire guide through-hole 101 and the dust adhered on the wire W, allowing the wire W to easily be inserted into the wire guide through-hole 101. In particular, an electrode wire of tungsten having diameter of 60 microns is used as the wire W, the rotation rate of the driving shaft 40 is adjusted within a range from approximately 500 to 1,000 rpm, the oscillation caused by the electromagnet devices 44, 45 is controlled to have frequency of approximately 500 Hz and amplitude within a range from 2 to 5 microns.

Figure 10:
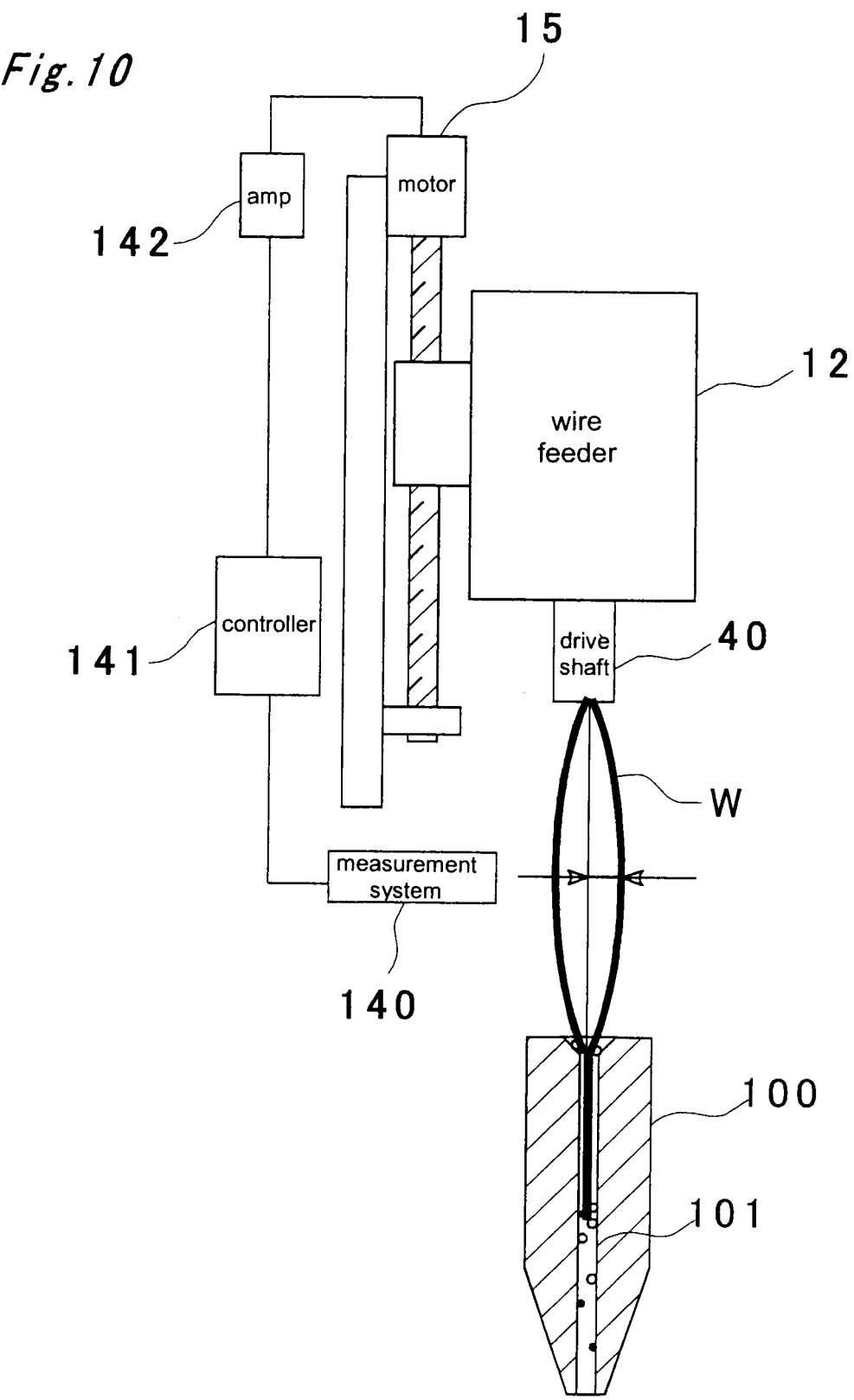
FIG. 10 is a schematic view of the measurement device for detecting displacement of the wire.

In FIG. 10, another process for inserting the wire W into the wire guide through-hole 101 is illustrated, in which an optical measurement system 140 is provided to observe, from its side, displacement of the wire W between the head assembly 50 and the lower wire guide member 100. The measurement system 140 includes a camera using an image pickup tube and an optical lens, for imaging contrast of the object to be observed, which is available as a brand name of "MODEL 100H, Uniaxial Displacement Measurement System" from Zimmer Japan Corporation. The measurement system 140 is connected with the input of a controller 141. Also, the output of the controller 141 is connected with the motor 15 through an amplifier 142. According to the embodiment, the measurement system 140 observes image of the displaced (bowing) shape for the wire W rotating together with the driving shaft 40. Such image data is input to the controller 141, which calculates the amount of displacement (bowing) of the wire W based upon the image data and adjusts the power of the amplifier for controlling the lowering rate of the wire feeder 12 by the motor 15. In particular, the controller 141 is adapted to reduce the rotation rate of the motor 15 when the displacement of the wire W is beyond a predetermined value, and rather maintain the rotation rate of the motor 15 when the displacement of the wire W is zero or closed to zero. Also, the controller 141 may be designed to lift up the wire feeder 12 together with the wire W if the displacement of the wire W is beyond a predetermined value or if the displacement of the wire W exceeding another predetermined value has been observed for a time period longer than a give period, and to lower again the wire feeder 12 and the wire W upon detection of no displacement of the wire W. As above, since the wire W driven upwardly or downwardly in response to measurement of the measurement system 140, it is inserted into the wire guide through-hole 101 safely without being bent. Further, while the displacement of the wire W is less than a given value, the motor may be driven to rotate at higher rate, thereby forwarding the wire W more quickly. This reduces the time period required for inserting the wire W into the wire guide through-hole 101.

Figure 11:
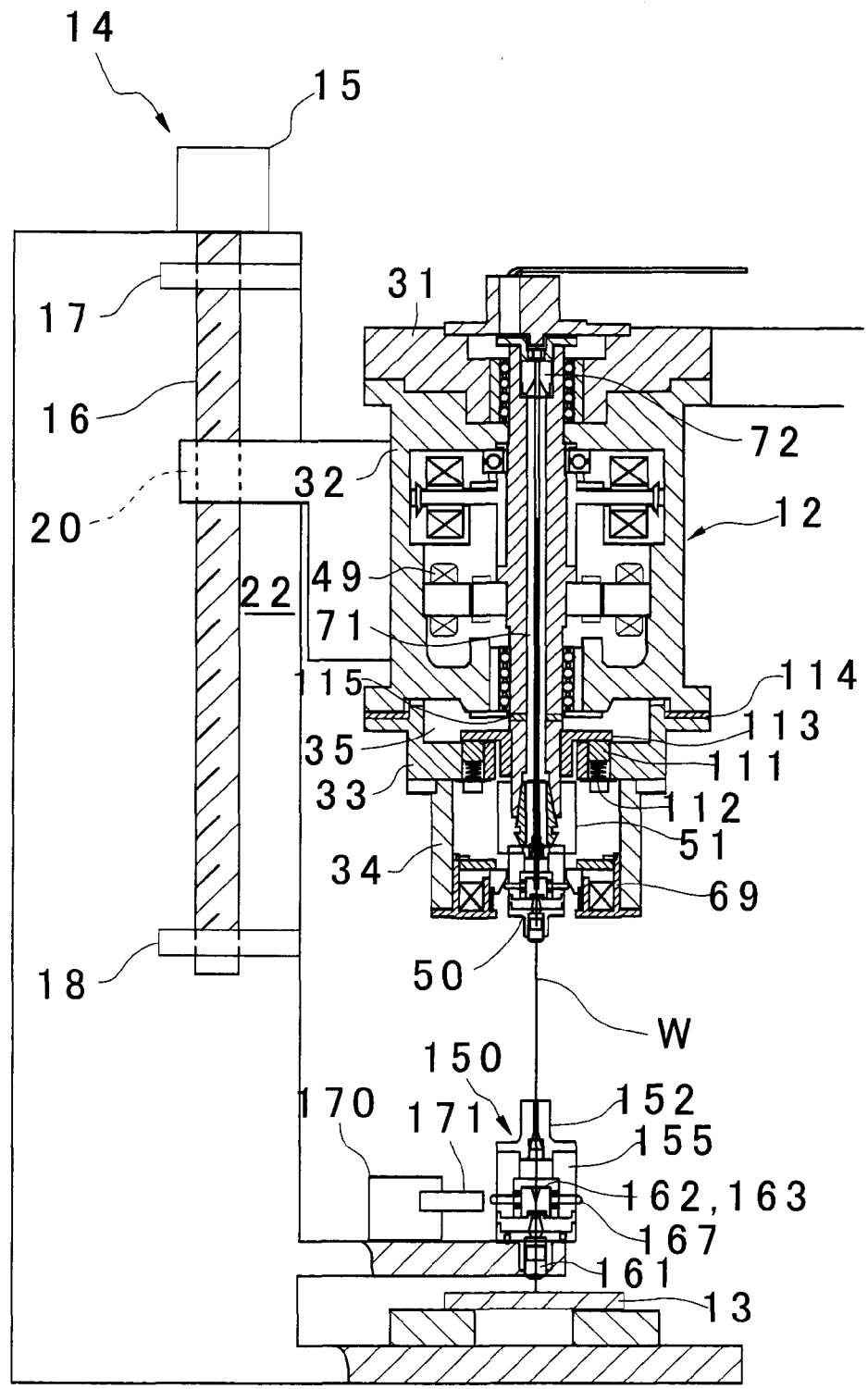
FIG. 11 is a cross sectional view of the electrical discharge machine having the lower wire guide similar to the head assembly.

Another embodiment of the electrical discharge machine is illustrated in FIG. 11. As shown, the electrical discharge machine includes another lower wire guide member 150 adapted for guiding the wire W fed out of the head assembly 50, which has a structure similar to the head assembly 50. In the following description, components of the lower wire guide member 150 will be denoted with reference numerals equivalent to 100 plus reference numerals indicative of the respective components of the head assembly 50. In this embodiment, a solenoid 170 having a plunger 171 is provided adjacent the lower wire guide member 150. The plunger 171 of the solenoid 170 is structured to push the actuating member 167 extending from the housing 155 to shift the chucks 163 of the wire nipper 162 from the closed position to the opened position.

Next, operation of the wire feeder so structured will be described herein. During processing the work, the plunger 171 is kept extruding to maintain the chucks 163 of the lower wire guide member 150 at the opened position. In this context, the wire feeder 12 feeds out the wire W towards the process region by means of any one of the above-mentioned three wire feeding mechanisms or combination thereof. In order to lift up the driving shaft 40 with the wire W maintained at the current position, the plunger 171 of the solenoid 170 is retrieved backwardly, allowing the wire nipper 162 to hold the wire W. Also, the releasing mechanism 69 is activated for shifting the wire nipper 62 of the head assembly 50 to the opened position. Then, the motor 15 of the elevator 14 is driven to raise the wire feeder 12. This feeds the wire W out of the wire feeder 12. Since the bottom of the wire W is held by the wire nipper 162 of the lower wire guide member 150, the wire is not moved upwardly in accompanying with the wire feeder 12. After that, in order to feed the wire W to the discharge position, the plunger 171 of the solenoid 170 of the lower wire guide member 150 is driven to extrude for shifting the chucks 163 of the wire nipper 62 from the closed position to the opened position. To this result, the wire feeding is again processed as above, to feed the wire W towards the discharge position.

It should be noted that means for switching between the wire holding condition and the wire releasing condition of the lower wire guide member 150 is not necessarily limited to the solenoid in the present embodiment, rather, it may be composed of a motor and other members operating due to rotation of the motor.

Figure 12:
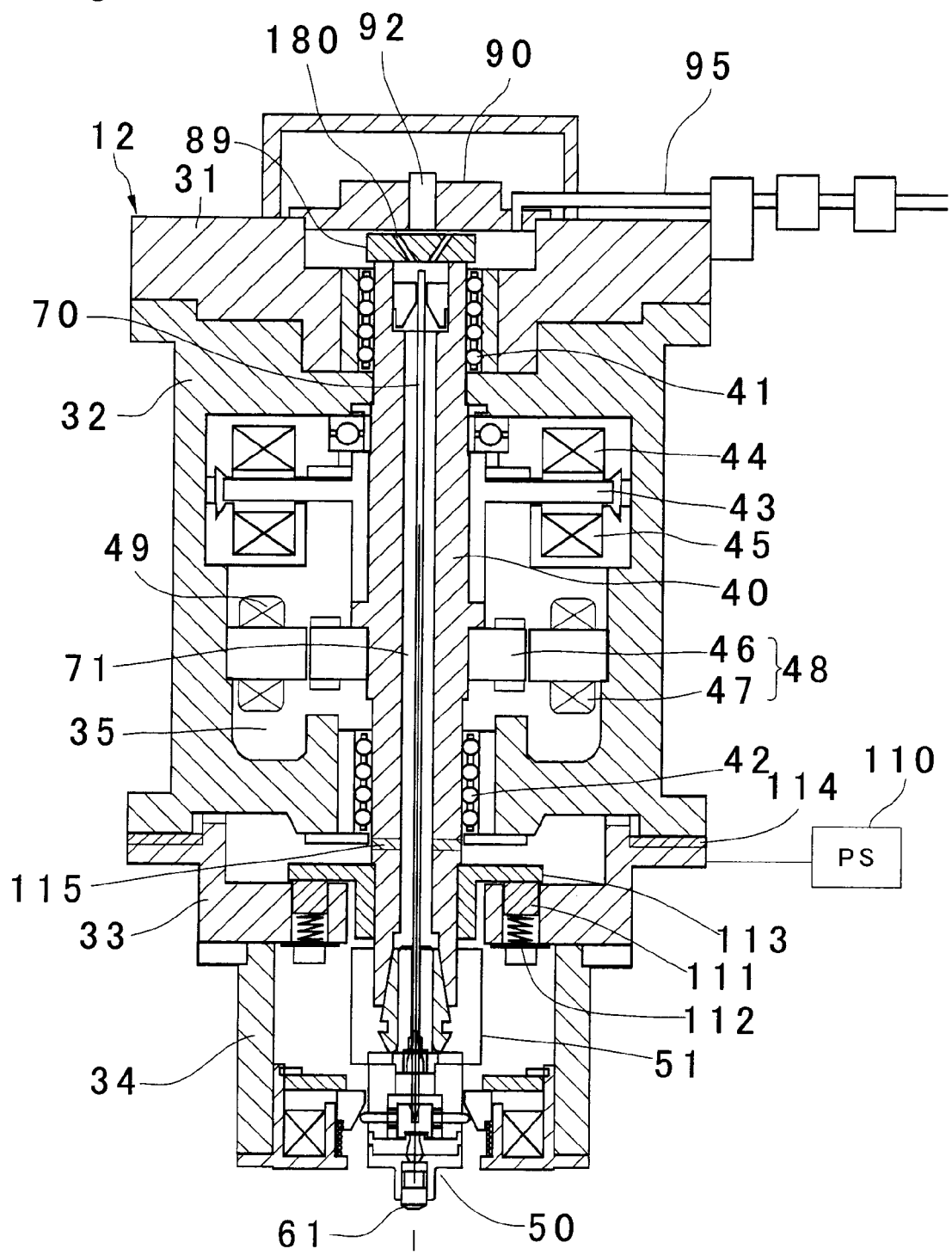
FIG. 12 is a vertical cross sectional view of the wire feeder according to another embodiment, for supplying air into the guide tube.

Another embodiment of the electrical discharge machine is illustrated in FIG. 12. As illustrated, according to the present embodiment, the gap sensor 92 for measuring the gap between the internal and external cover plates 89, 90 is arranged along the central axis Z of the driving shaft 40. Also, the internal cover plate 89 has two or more air conduits 180, each of which is extending from the top and bottom thereof and inclined symmetrically relative to the central axis Z, for guiding air from the air supply tube 95 into the wire guide tube 70. More particular, the air guided through the air conduits 180 blows on the top opening of the wire guide tube 70, thereby forming the wire supply stream in the wire guide tube 70. According to this embodiment, since the gap sensor 92 can be provided along the central axis Z, a measurement error due to inclination of the internal cover plate 89 can be eliminated.

Figure 13:
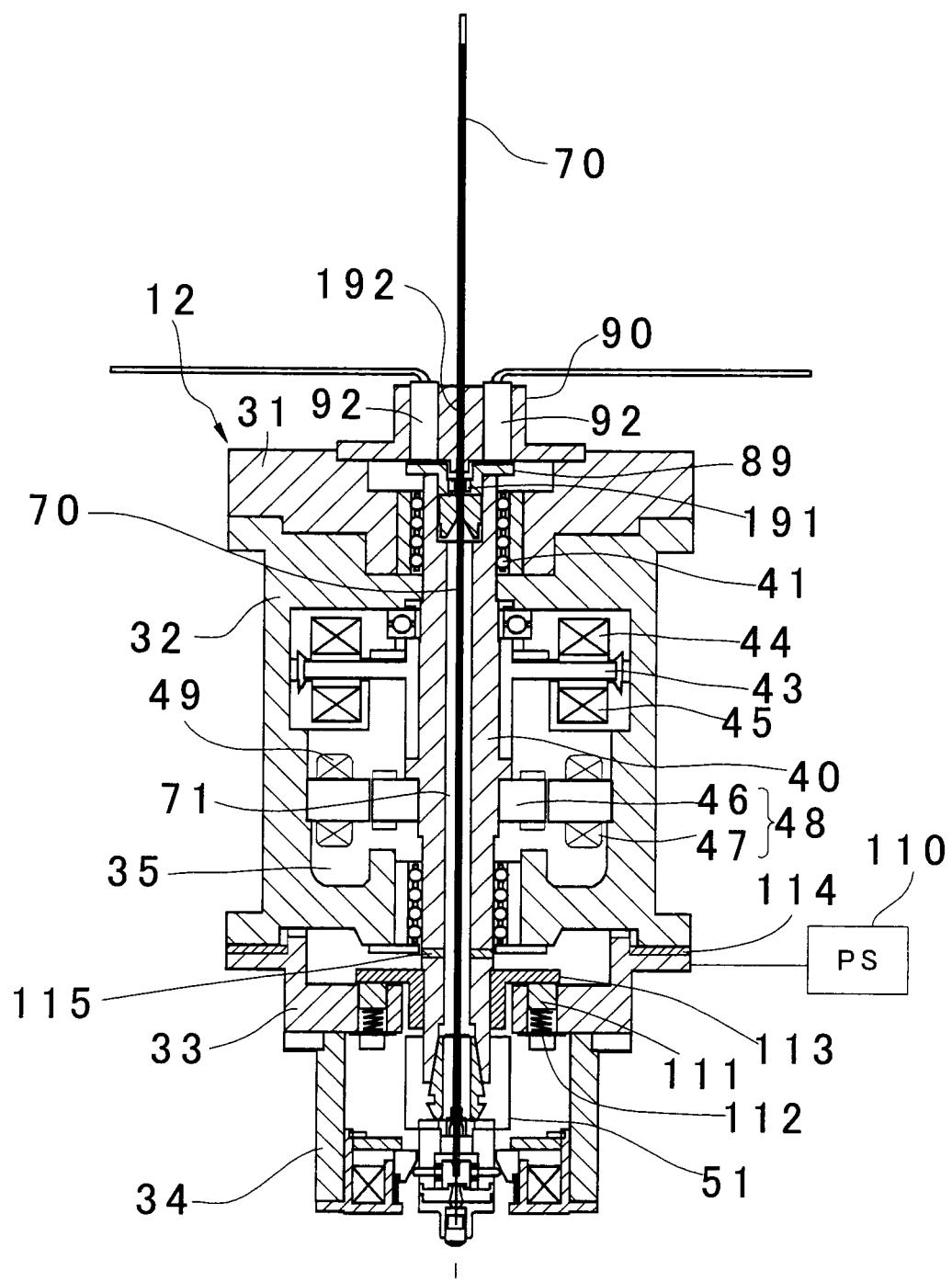
FIG. 13 is a cross sectional view of the electrical discharge machine using an elongated wire and wire guide.

Further embodiment of the electrical discharge machine is illustrated in FIG. 13. As illustrated, according to the present embodiment, the internal and external cover plates 89, 90 include through-holes 191, 192 extending along the central axis Z, respectively, through which an elongated wire guide tube 70 is inserted. To this end, the gap sensors 92 are arranged offset the central axis Z and symmetrically relative thereto. This allows using the wire much longer than those used in the foregoing embodiments so that the life (replacement cycle) of the wire is remarkably extended, thereby improving manufacturing efficiency. Also, since the gap is obtained by calculating the average of the detected values of the two sensors 92, the gap or the amplitude of the driving shaft 40 can be determined more precisely.

Figure 14:
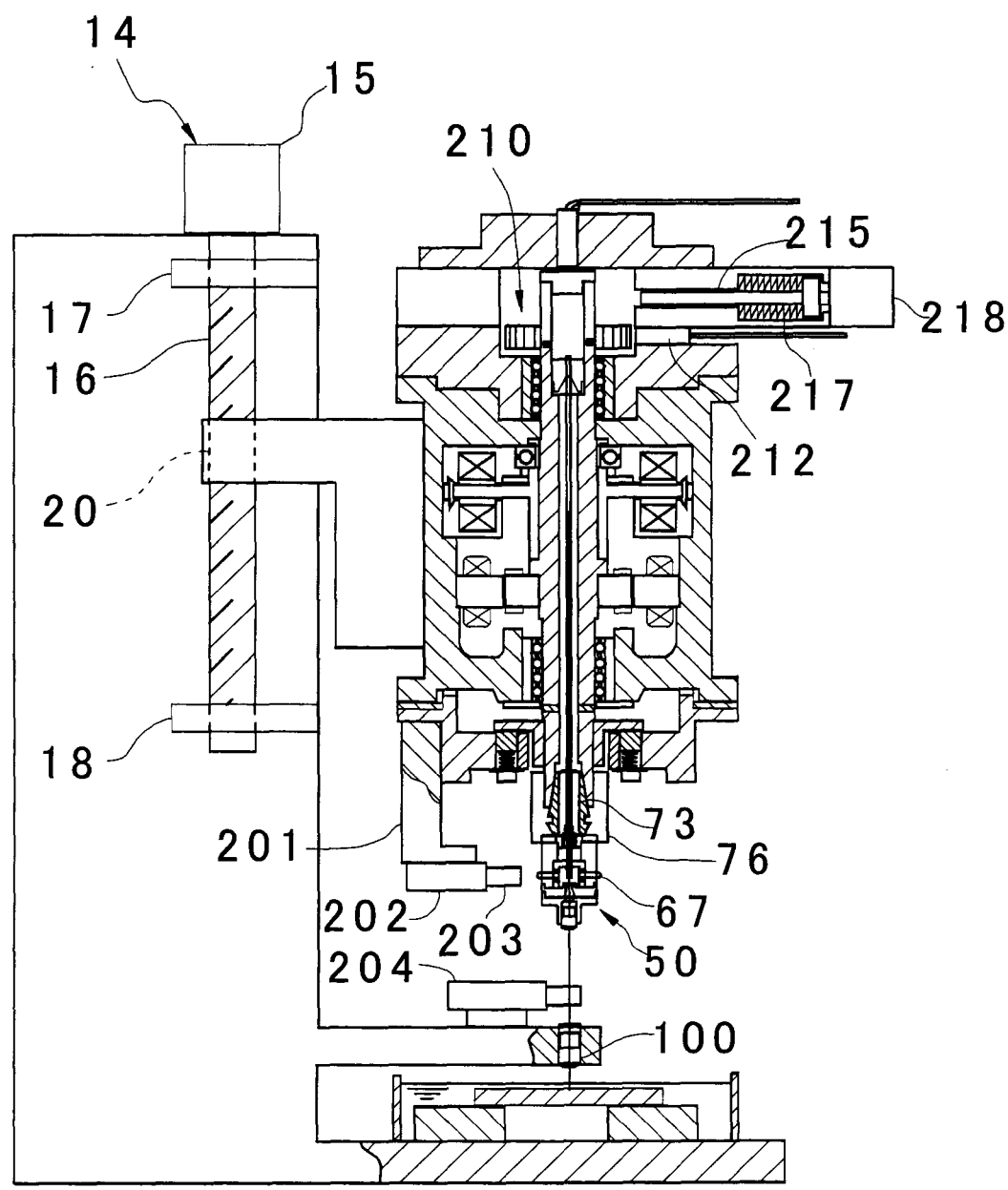
FIG. 14 is a vertical cross sectional view of the releasing mechanism of the wire nipper according to another embodiment.

Further embodiment of the electrical discharge machine is illustrated in FIG. 14. As illustrated, according to the present embodiment, a cylinder (driving member) 202 having a plunger 203 is used, in place of the releasing mechanism. The cylinder 202 is secured on the supporting member 201 provided with the housing 30, and the plunger 203 of the cylinder 202 opposes to the actuating member 67 of the head assembly 50 so as to force the actuating member 67 in response to driving motion of the cylinder 202, thereby shifting the wire nipper 62 from the closed position to the opened position. Also, a wire holding device 204 is provided at a position between the head assembly 50 and the lower wire guide member 100, capable of holding the wire W.

Figure 15:
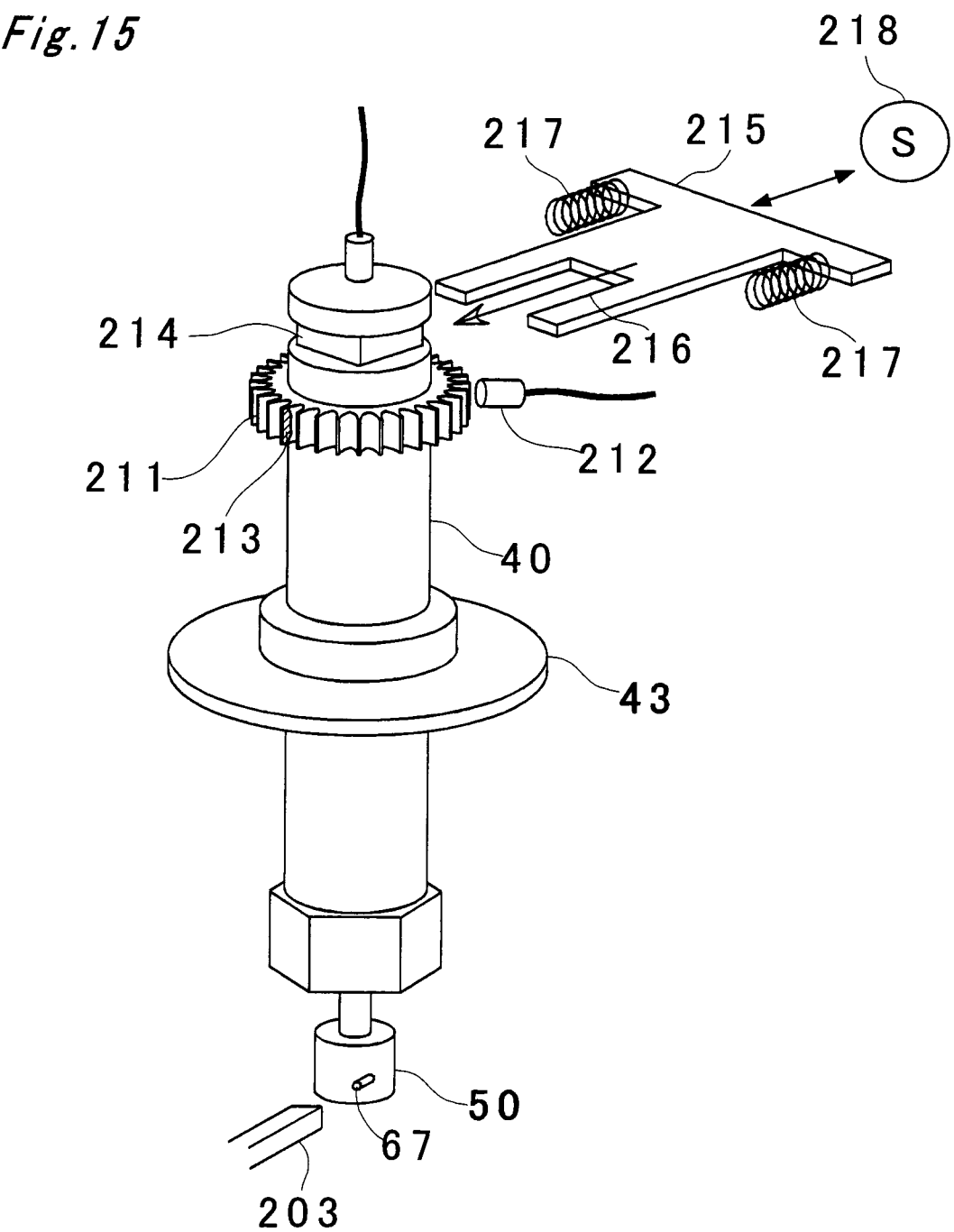
FIG. 15 is a perspective view of the restricting member for restricting rotation of the driving shaft.
Figure 16:
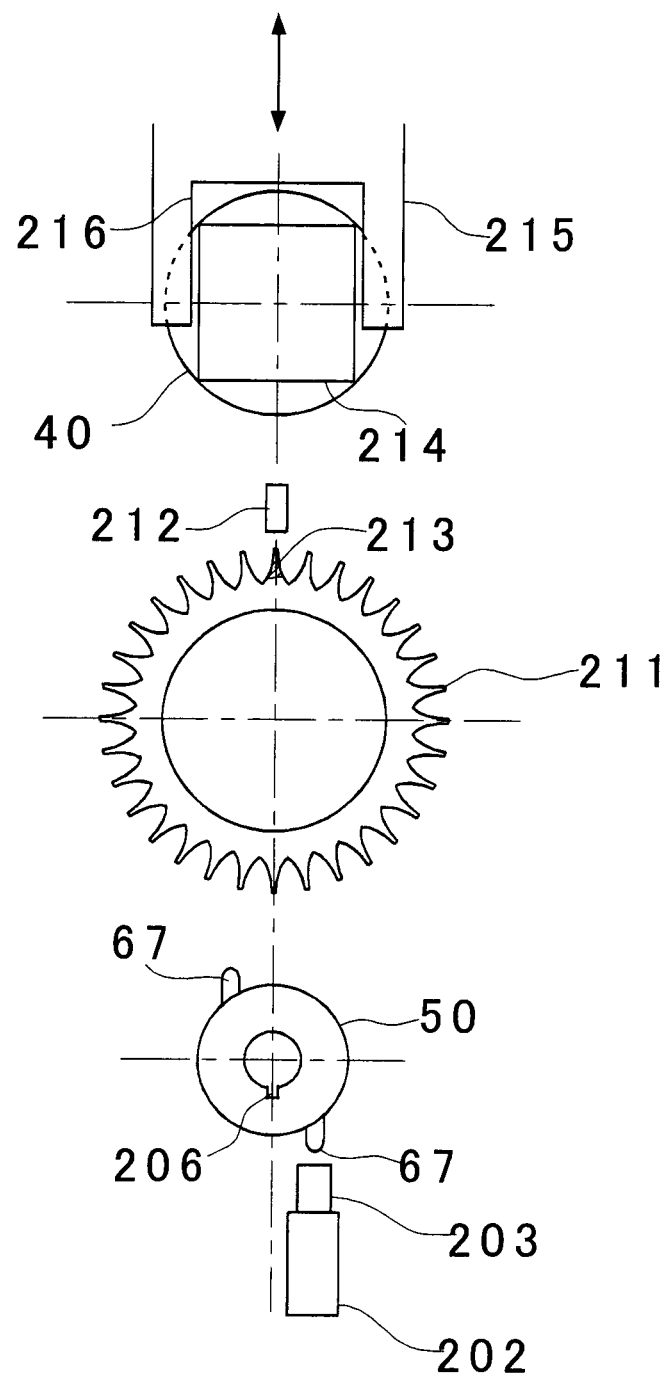
FIG. 16 is view showing relative position between the sensor and the actuating member.

In order to hold the driving shaft at an angular position where the plunger 203 of the cylinder 202 opposes to the actuating member 67, a locking-position restricting mechanism 210 is provided over the housing 30. As illustrated in FIG. 15, the locking-position restricting mechanism 210 includes a gear 211 attached with the driving shaft 40 over the upper bearing 41, and a sensor 212 secured on the housing 30, in which the sensor 212 detects an object 213 being detected at a particular position on the gear 211 relative to the sensor 212. Any combination of the sensor 212 and the object 213 being detected can be chosen, for instance, a magnetic sensor and a magnet, or a photo sensor and a douser may be used. Meanwhile, as shown in FIG. 16, the head assembly 50 has a boss 206 at its circumference and the collet 73 has a boss-receiving groove (not shown). This allows the head assembly 50 to be coupled with the driving shaft 50 only when the head assembly 50 has a certain angular position relative to the driving shaft 50, that is, only when the sensor 212 opposes to the object 213.

The driving shaft 40 has an angulated portion 214 having a transverse cross section of rectangular shape. It should be noted that the angulated portion 214 may have another shape rather than rectangle, e.g., hexagon or octagon. Also, the housing includes a restricting member 215 which can move horizontally back and forth relative to the driving shaft 40. The restricting member 215 has a fork 216 with an opening of which size is slightly greater than minimum width of the angulated portion 214 so that the fork 216 holds the angulated portion 214 when the restricting member 215 advances to the driving shaft 40. Normally, the restricting member 215 is biased at a retrieved position by a spring 217 received within the housing 30. Also, the restricting member 215 is connected with a solenoid 218 secured on the housing 30, which drives to move the restricting member 215 towards the advanced position against the biasing force of the spring 217, thereby holding the driving shaft 40.

According to the electrical discharge machine so structured, the solenoid 218 drives in accordance with the output of the sensor 212 to move the restricting member 215 from the retrieved position to the advanced position, so that the tip fork 216 of the restricting member 215 holds the angulated portion 214 of the driving shaft 40 at the desired angular position. Next, the wire holding device 204 holds the wire W, and the solenoid 202 drives the plunger 203 to push the actuating member 67 of the wire nipper 62, thereby shifting it from the closed position to the opened position. The elevator drives the wire feeder 12 to move upwardly without the wire W since it is held by the wire holding device 204. When a predetermined length of the wire W is fed out of the head assembly 50, the cylinder 202 is deactivated to release the actuating member 67 of the wire nipper 62 so that the wire nipper 62 holds the wire W, while the wire holding device 204 is also deactivated to release the wire W. Also, the solenoid 218 drives the restricting member 215 backward to allow rotation of the driving shaft 40.

In order to replace the wire W together with the head assembly 50, the wire feeder 12 is lifted up by the elevator 14, rotation of the driving shaft 40 is prohibited by engagement of the restricting member 215 with the driving shaft 40. Next, the nut 76 is loosened to remove the head assembly 50 and the wire guide tube 70 from the driving shaft 40. Then, after a new wire is installed with the head assembly 40, the collet 73 is coupled back with the driving shaft 40 and the nut 76 is tightened. Since the driving shaft is prevented from rotating by means of the restricting member 215, the nut 76 can be operated in an effective manner. After completion of tightening operation of the nut 76, the restricting member 215 biases to the retrieved position, for allowing rotation of the driving shaft 40.

The invention claimed is:

1. An electrical discharge machine, comprising:
a cylindrical hollow driving shaft having a space for receiving a guide tube with a thin electrode wire;
a head assembly detachably coupled with a bottom portion of said driving shaft, said head assembly including a first holding member for holding the guide tube, and a second holding member for holding the thin electrode wire extending from a bottom opening of the guide tube; and
an air supply mechanism adjacent a top portion of the guide tube, and air supplied from the air supply mechanism is introduced into the guide tube to convey the wire downwardly,
wherein the guide tube has an inner surface formed of water-repellent material.

2. An electrical discharge machine, comprising:
a cylindrical hollow driving shaft having a space for receiving a guide tube with a thin electrode wire; and
a head assembly detachably coupled with a bottom portion of said driving shaft, said head assembly including a first holding member for holding the guide tube, and a second holding member for holding the thin electrode wire extending from a bottom opening of the guide tube.

3. The electrical discharge machine according to claim 2 further comprising an air supply mechanism adjacent a top portion of the guide tube, wherein the air supplied from the air supply mechanism is introduced into the guide tube to convey the wire downwardly.

4. The electrical discharge machine according to claim 3, wherein the guide tube has an inner surface formed of water-repellent material.

5. The electrical discharge machine according to claim 2, further comprising:
a housing for rotatably supporting said driving shaft around a central axis thereof; and
a first elevator for moving said housing in the vertical direction.

6. The electrical discharge machine according to claim 5, wherein said housing includes means for switching between a holding position where the second holding member holds the wire and a releasing position where the second holding member releases the wire.

7. The electrical discharge machine according to claim 6, wherein the second holding member includes a pair of chucks sandwiching the wire and opposing each other, and a spring for biasing the chucks in an opposite direction, wherein the means for switching has an engaging member engaging with the chucks against the biasing force of the spring, thereby to space the chucks apart from each other.

8. The electrical discharge machine according to claim 5, further comprising a second elevator for moving said driving shaft relative to said housing in the vertical direction.

9. The electrical discharge machine according to claim 5, further comprising a rotating mechanism for rotating said driving shaft relative to said housing.

10. The electrical discharge machine according to claim 2, further comprising:
a plurality of moving members moving between a replacing position beneath said driving shaft and an evacuating position away from the replacing position; and
a plurality of head holders, each provided on the respective moving member, wherein each of the head holders holds, at the replacing position, said head assembly that is coupled with said driving shaft, thereby to prevent rotation of said head assembly.

11. The electrical discharge machine according to claim 10, wherein said driving shaft includes an internal or external thread for engaging with an external or internal thread of said head assembly, respectively.

12. The electrical discharge machine according to claim 11, wherein each of said head holders rotate while holding said head assembly at the replacing position so that said head assembly is coupled with and removed from said driving shaft by relative rotation between the internal and external threads.

13. The electrical discharge machine according to claim 11, wherein said driving shaft rotates while said head holder holds said head assembly at the replacing position so that said head assembly is coupled with and removed from said driving shaft by relative rotation between the internal and external threads.

14. The electrical discharge machine according to claim 13, wherein a disengaging rate of the internal and external threads is equivalent to a lifting rate of said housing driven by said first elevator.

15. The electrical discharge machine according to claim 13, wherein an engaging rate of the internal and external threads is equivalent to a lowering rate of said housing driven by said first elevator.

* * * * *